(12) United States Patent
Takeda et al.

(10) Patent No.: US 9,813,385 B2
(45) Date of Patent: Nov. 7, 2017

(54) METHOD AND SYSTEM FOR LOAD BALANCING

(71) Applicant: DeNA Co., Ltd., Tokyo (JP)

(72) Inventors: Yutaka Takeda, San Mateo, CA (US); Bryan D. English, San Francisco, CA (US); Yusuke Shinozaki, Tokyo (JP)

(73) Assignee: DeNA CO., LTD., Tokyo (JP)

( * ) Notice: Subject to any disclaimer, the term of this patent is extended or adjusted under 35 U.S.C. 154(b) by 90 days.

(21) Appl. No.: 14/618,816

(22) Filed: Feb. 10, 2015

(65) Prior Publication Data

US 2016/0234298 A1    Aug. 11, 2016

(51) Int. Cl.
*H04L 29/06*    (2006.01)
*H04L 29/08*    (2006.01)

(52) U.S. Cl.
CPC ........ *H04L 63/0428* (2013.01); *H04L 69/165* (2013.01); *H04L 67/1002* (2013.01); *H04L 69/08* (2013.01)

(58) Field of Classification Search
CPC .............. H04L 63/0428; H04L 69/165; H04L 67/1002; H04L 69/08
See application file for complete search history.

(56) References Cited

U.S. PATENT DOCUMENTS

| | | | |
|---|---|---|---|
| 7,149,807 B1* | 12/2006 | Kontothanassis ... | H04L 67/1008 709/224 |
| 2012/0155359 A1* | 6/2012 | Peters ..................... | H04L 12/18 370/312 |
| 2013/0163470 A1* | 6/2013 | Chidambaram ...... | H04L 69/161 370/255 |
| 2014/0006632 A1* | 1/2014 | Evens ................... | H04L 65/605 709/227 |
| 2015/0106616 A1* | 4/2015 | Nix ................... | H04W 52/0235 713/156 |

OTHER PUBLICATIONS

User Datagram Protocol, J. Postel, ISI, Aug. 28, 1980, RFC 768, http://tools.ietf.org/html/rfc768.

* cited by examiner

*Primary Examiner* — Walter Divito
(74) *Attorney, Agent, or Firm* — Procopio, Cory, Hargreaves & Savitch LLP (57) ABSTRACT

Example implementations are directed to the facilitation of UDP load balancing even in implementations that involve load balancers that support only TCP. In example implementations, the application can control the session lifetime through the accompanying TCP connection. Thus, example implementations can make use of any load balancer that supports only TCP.

21 Claims, 10 Drawing Sheets

Example Headers for Frames

| VER 400 | ACK 401 | METHOD 402 | RESERVED 403 | U/R 403-1 | PAYLOAD OFFSET 404 |

FIG. 4A

| KIND 405 | LENGTH 406 | VALUE 407 |

Management Information

| TCP Token | UDP Token | Shared Key |
|---|---|---|
| TCP1 | UDP1 | KEY1 |
| TCP2 | NULL | KEY2 |
| TCP3 | UDP2 | KEY3 |
| ... | ... | ... |

FIG. 10

METHOD AND SYSTEM FOR LOAD BALANCING

BACKGROUND

Field

The present disclosure relates generally to network systems, and more specifically, to facilitation of User Datagram Protocol (UDP) and Transmission Control Protocol (TCP) connections between a client device and a server.

Related Art

In related art network systems implementing real time applications, TCP-based communications are utilized between the client device and the server. TCP-based communications may incur undesirable latency over a lossy connection by requiring retransmissions of data packets between the client device and the server.

Such network systems may desire UDP communications. However, related art UDP based systems may be connection-less, in other words, the lifetime of the connection is not manageable. Further, related art UDP-based systems may implement load balancers that do not support or recognize UDP-based transmissions. Even if the load balancer supports UDP, the related art implementations manage the session lifetime by timeouts instead of facilitating an actual connection.

Further, related art systems may not implement UDP. In such scenarios, there may not be any standard protocol to support a shared (e.g., listening) port on server. UDP server ports may also be subject to security issues, such as a distributed denial of service (DDoS) attack.

Some related load balancers may support UDP load balancing. However, such related art implementations are based on source internet protocol (IP) 'sticky' (e.g., forward UDP packets to a specific server process based on the source IP address), of which the lifetime is based on timeouts.

SUMMARY

Aspects of the present disclosure include an apparatus, which can include a processor, configured to transmit a transmission control protocol (TCP) token over a TCP connection; and upon receipt of a request comprising the TCP token over a User Datagram Protocol (UDP) connection, transmit a UDP token over the UDP session (e.g., transmit an acknowledgement over the UDP session).

Aspects of the present disclosure can further include a method, which includes transmitting a transmission control protocol (TCP) token over a TCP connection; and upon receipt of a request comprising the TCP token over a User Datagram Protocol (UDP) connection, transmitting a UDP token over the UDP session.

Aspects of the present disclosure can further include a non-transitory computer readable medium storing instructions for executing a process. The instructions can include transmitting a transmission control protocol (TCP) token over a TCP connection; and upon receipt of a request comprising the TCP token over a User Datagram Protocol (UDP) connection, transmitting a UDP token over the UDP session.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

In related art implementations, UDP sessions are maintained by timeouts, however, the timeout may occur without any awareness from the client device application. Further, many related art load balancers do not support UDP. As a result, there can be limited choices in infrastructure services. Further, related art applications may not have a UDP load balancer with application controlling session lifetime support available. Existing related art load balancers that support UDP only conduct timeout-based session management. Example implementations facilitate applications that use UDP to use any load balancer, regardless of the load balancer support of UDP.

Example implementations are directed to the facilitation of UDP load balancing, even in implementations that involve load balancers that support only TCP. In example implementations, the application can control the session lifetime through the accompanying TCP connection. Thus, example implementations can make use of any load balancer that supports only TCP. By use of the example implementations, low latency data delivery can be achieved for applications such as real-time game applications, but not limited thereto. The example implementations utilize a load balancer that supports TCP, as well as facilitating a TCP/UDP bridge even in cases where TCP is only available at the service provider end.

Further, related art applications may not have a UDP load balancer with application controlling session lifetime support available. Existing related art load balancers that support UDP conduct timeout based session management. The example implementations allow applications that use UDP to use any load balancer regardless of its support of UDP to balance the load of UDP traffic. The example implementations also facilitate an application which can control the session lifetime with a paired TCP connection.

In example implementations, to facilitate the use of UDP traffic between a client device and a server process in a system with a load balancer utilizing TCP connection, a UDP proxy is provided. The UDP proxy will utilize the TCP connection to manage the UDP session, wherein the lifetime of the UDP session to a client device will be based on the lifetime of the TCP connection to the client device. During the TCP connection, the UDP proxy can receive UDP sessions from the client device, and multiplex TCP and UDP frames onto a TCP connection with a server process. Thus, the load balancer only utilizes TCP connections, but can receive UDP data transmitted from the client device. The UDP session can involve the combination of source IP address/port pair and destination IP address/port pair.

Through the proposed UDP proxy, the applications of the client device can transmit reliable data over TCP, and unreliable data over UDP to a single endpoint. Because UDP session may be unsecure, the client device can utilize the TCP token from the UDP proxy and transmit the TCP token over a UDP session with the UDP proxy to identify the client device. The UDP proxy can then return an acknowledgement, and complete the handshake with the client device for the UDP session.

In the example implementations, TCP and UDP tokens are generated by the UDP proxy for authentication purposes with the client device. As the TCP and UDP tokens are utilized as authentication, the generated token is generated to be unpredictable by utilizing high entropy, or a cryptographically strong random number or series of bytes.

In example implementations, there are implementations of multiplexing and demultiplexing data from/to various data sources (e.g. TCP and UDP), as well as implementations for framing between a UDP Proxy and Server Process, as well as a Client and UDP Proxy over TCP. This allows for the multiplexing of data from TCP and UDP sources for transmission over TCP to a server process by the UDP proxy. Further, the UDP proxy can receive communications from the server process and demultiplex the communications to transmit data back over the corresponding TCP or UDP session to the corresponding client device.

Figure 1:
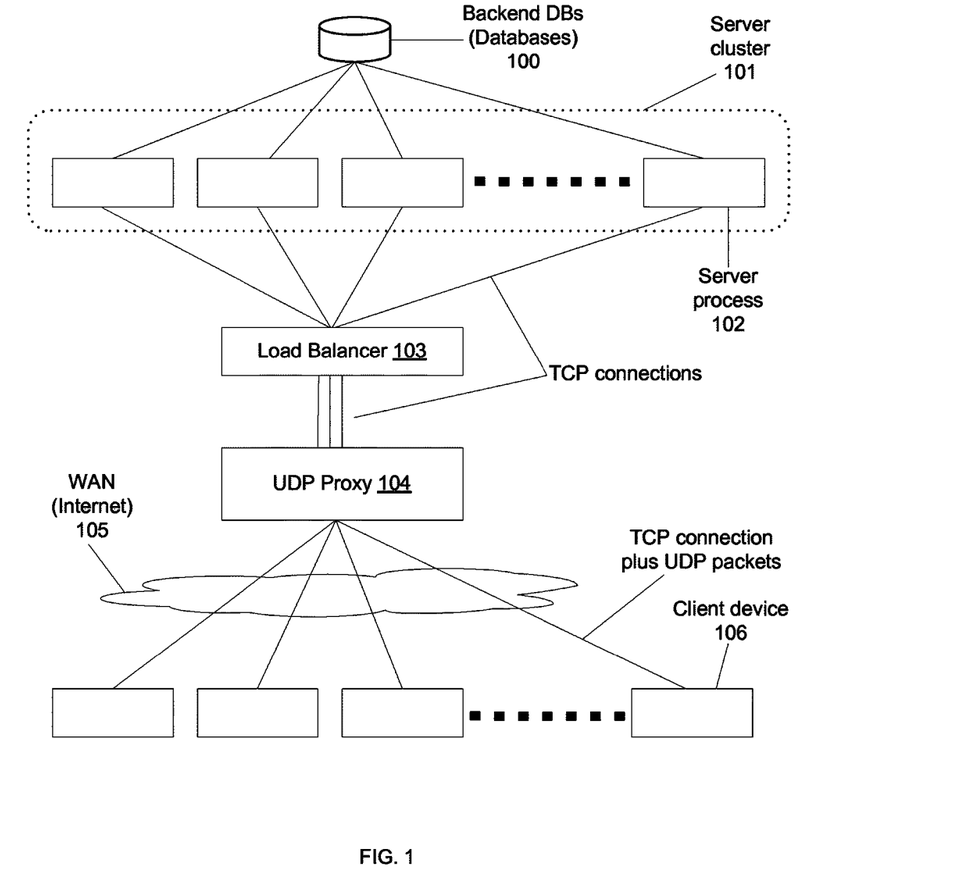
FIG. 1 illustrates a system in accordance with an example implementation.

FIG. 1 illustrates a system in accordance with an example implementation. The system can involve databases (DBs) 100 such as backend DBs (but not limited thereto), a server cluster 101 having one or more server processes 102, a load balancer 103, a User Datagram Protocol (UDP) proxy 104, a network 105 (e.g. internet or wide area network (WAN)), and one or more client devices 106. The one or more client devices 106 can include any internet-capable client devices such as personal computers (PCs), mobile phones, user equipment, and so on. The load balancer 103 and UDP proxy 104 can be integrated together (e.g., as a front end of a data cluster), or as separate apparatuses with a security protocol connecting them.

The network 105 can include (but is not limited to) a wide area network (WAN) that facilitates an internet connection between the one or more client devices 106 and the UDP proxy 104, wherein the client devices 106 can establish a Transmission Control Protocol (TCP) connection to the UDP proxy 104 as well as sending UDP packets to the UDP Proxy 104. UDP Proxy 104 can be implemented as a server side, front-end machine (e.g. machines that run an operating system), and can maintain TCP connections to the load balancer. The one or more server processes 102 that form the server cluster 101 can be implemented as machines (e.g., hardware) that run one or more application processes, and can be configured to terminate TCP traffic and implement framing to extract data from the TCP stream. The one or more server processes 102 can interact with backend DBs 100 to obtain or store data, depending on the desired implementation.

Figure 2:
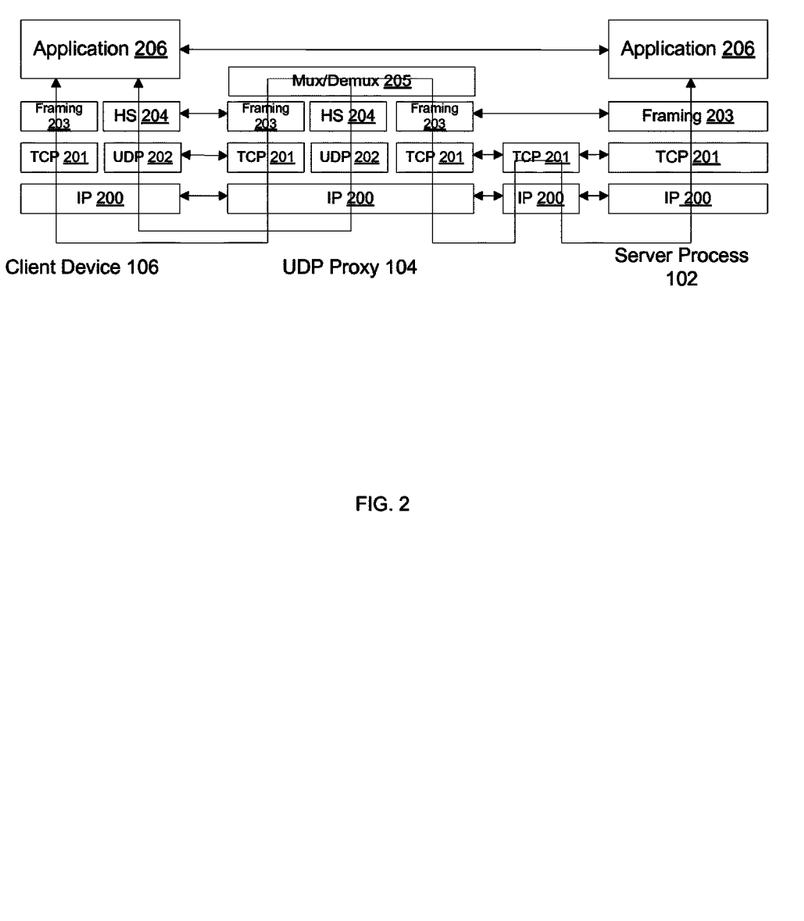
FIG. 2 illustrates the protocol layers of the system, in accordance with an example implementation.

FIG. 2 illustrates the protocol layers of the system, in accordance with an example implementation. The arrows of FIG. 2 illustrate the flow of communications that can occur through each of the protocol layers. The underlying protocol of the system is IP 200, which is utilized for the communications between the client device, the UDP proxy and the server process. The client device will communicate with the UDP proxy either through TCP 201 or UDP 202 over the IP protocol. The UDP proxy will communicate with the client device through TCP 201 and UDP 202, and will communicate with the server process through TCP 201. The UDP proxy is configured to facilitate communicating UDP transmissions from the client device to the server process over the TCP, and to send the TCP replies from the server process to the client device through UDP as appropriate.

The transmissions through TCP or UDP can be associated with a Handshake (HS) 204 or Framing 203. Framing 203 is conducted by the client device and UDP proxy to multiplex/demultiplex frames to/from a data stream using a frame header or a delimiter, and can be associated with a packet length. HS 204 is conducted by the client device and UDP proxy to facilitate a Hello/Acknowledge sequence using a token (received via TCP) to pair with TCP 201, and to facilitate UDP connectivity.

UDP proxy may include Mux/Demux (multiplexer and demultiplexer) configured to multiplex/demultiplex TCP frames and UDP packets to/from a TCP connection with a server process. Application layer 206 may facilitate the software utilized by the client device and the server process that utilize the underlying layers of FIG. 2.

Figure 3:
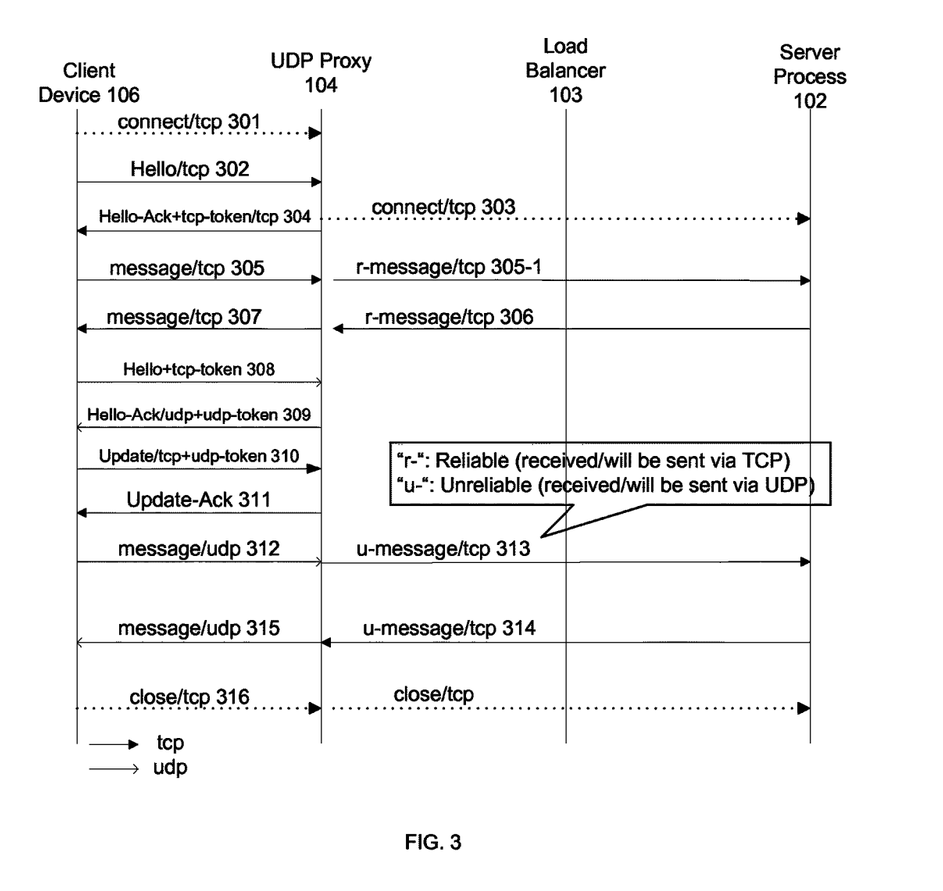
FIG. 3 illustrates an example of the flow diagram of the system, in accordance with an example implementation.

FIG. 3 illustrates an example of the flow diagram of the system, in accordance with an example implementation. Arrows in bold indicate TCP connections, and unbolded arrows indicate UDP sessions. At 301, a client device 106 connects to the UDP proxy 104 through a TCP connection over a network. At 302, the client device 106 sends a request to transmit message over TCP (e.g., Hello/TCP) to the UDP Proxy 104. At 303, the UDP Proxy 104 connects to a corresponding server process 102 through TCP (e.g., connect/TCP). At 304, the UDP Proxy 104 replies to the client device 106 with an acknowledgement and a TCP token for identification. At 305, the UDP Proxy 104 receives a message from the client device and at 305-1 forwards the message to the server process 102 with a flag indicating that the message the message is reliable (e.g., that the message was received and will also be sent over TCP connection). At 306, the server process 102 processes the received message and sends a reply message to the UDP proxy 104 with a flag indicating the message as reliable. At 307, the message is relayed by the UDP Proxy 104 to the client device 106 over TCP.

In example implementations, UDP can be utilized through the UDP proxy 104 during the TCP session. At 308, the client device 106 sends a request to transmit over UDP to the UDP proxy 104 with the TCP token to identify the client device 106. At 309, the UDP proxy 104 sends an acknowledgement to the client device 106 over UDP, along with a UDP token for identification. At 310, the client device 106 sends an update over TCP with the UDP token to indicate that a UDP message is to be transferred. At 311, the UDP proxy 104 responds to the client device 106 with an acknowledgement over TCP. At 312, the client device 106 sends a message over UDP. At 313, the UDP proxy 104 relays the message to the server process 102 over TCP with a flag to indicate that the message is unreliable (e.g., the message was sent through UDP). At 314, the server process 102 processes the messages and replies with a message over TCP with the unreliable flag. At 315, the UDP proxy 104 relays the message back to the client device 106 over UDP. At 316, the client device 106 closes the TCP connection with the UDP proxy 104, whereupon the UDP proxy 104 closes the TCP connection with the server process 102.

Figure 4A:
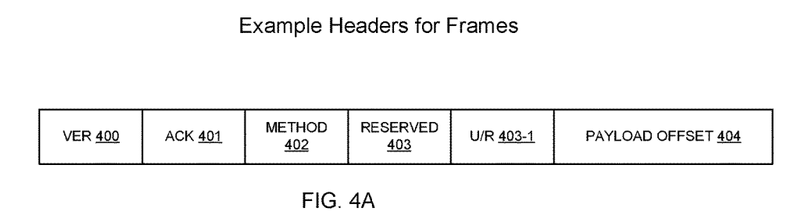
FIGS. 4A and 4B illustrate headers for frames used in the communications of FIG. 3, in accordance with an example implementation.
Figure 4B:
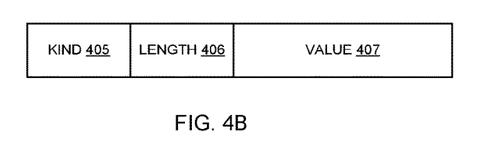

FIGS. 4A and 4B illustrate example headers for frames used in the communications of FIG. 3, in accordance with an example implementation. Specifically, FIG. 4A illustrates an example main header, and FIG. 4B illustrates an example attribute header. Each frame may include a main header, a payload (application data), and any relevant attributes.

In FIG. 4A, the main header may be implemented in a number of bytes, with bytes to indicate the type, reserved, and payload offset. The example of FIG. 4A can be used for TCP packets as well as UDP packets, depending on the desired implementation. For example, in a four byte configuration, one byte is used for type as explained below, one byte is used for reserved 403, and two bytes are used for payload offset 404. For the type byte(s), one or more bits can be utilized as a Version 400, Acknowledgment 401 and Method 402. Version 400 indicates the protocol version of the frame (e.g., current version is 0, 0b00, etc.). The Acknowledgement 401 can be a bit indicating an acknowledgement. The Method 402 indicates the type of message transferred by the frame. For example, 0 can indicate data, 1 can indicate Hello, 2 can indicate Ping/Pong, 3 can indicate update, and others can be reserved depending on the desired implementation. In example configurations of the main header of FIG. 4A, the TCP token can be configured to appear in the Hello-Ack.

The reserved portion 403 can initially have all bits set to zero, and each of the bits can be configured to convey information according to the desired implementation. For example, within the reserved 403 portion of the header, one or more bits can be used to represent the data to be unreliable or reliable (U/R 403-1) for communications between the UDP proxy and the server. For example, having the U/R 403-1 set to 0 can indicate that the message is TCP, whereas having the U/R 403-1 set to 1 can indicate a UDP transmission. In an example implementation, the U/R 403-1 can be used for frames transferred between UDP proxy and server, and U/R 403-1 can be set to 0 for frames between client device and UDP proxy regardless of the transport protocol. The one or more bytes for the payload offset can be implemented as an offset in bytes to the payload from the beginning of the header. The payload can be configured to be attached to the frame when the method indicates that the message is a data message.

In the example attribute header of FIG. 4B, one or more bytes can be allocated for the Kind 405, Length 406 and Value 407. For example, in a four byte implementation of the attribute header, one byte can be allocated for Kind 405, one byte can be allocated for Length 406 and two bytes can be allocated for Value 407. Kind 405 can indicate the kind of attribute that is attached to the attribute header. For example, 0 can be reserved, 1 can indicate TCP token, 2 can indicate UDP token, and 3 can indicate a secret key for UDP encryption. Length 406 can indicate the length of the value as represented in bytes, and Value 407 can represent the value of the data attached to the header. Payload included with the attribute header can include application data.

Figure 5:
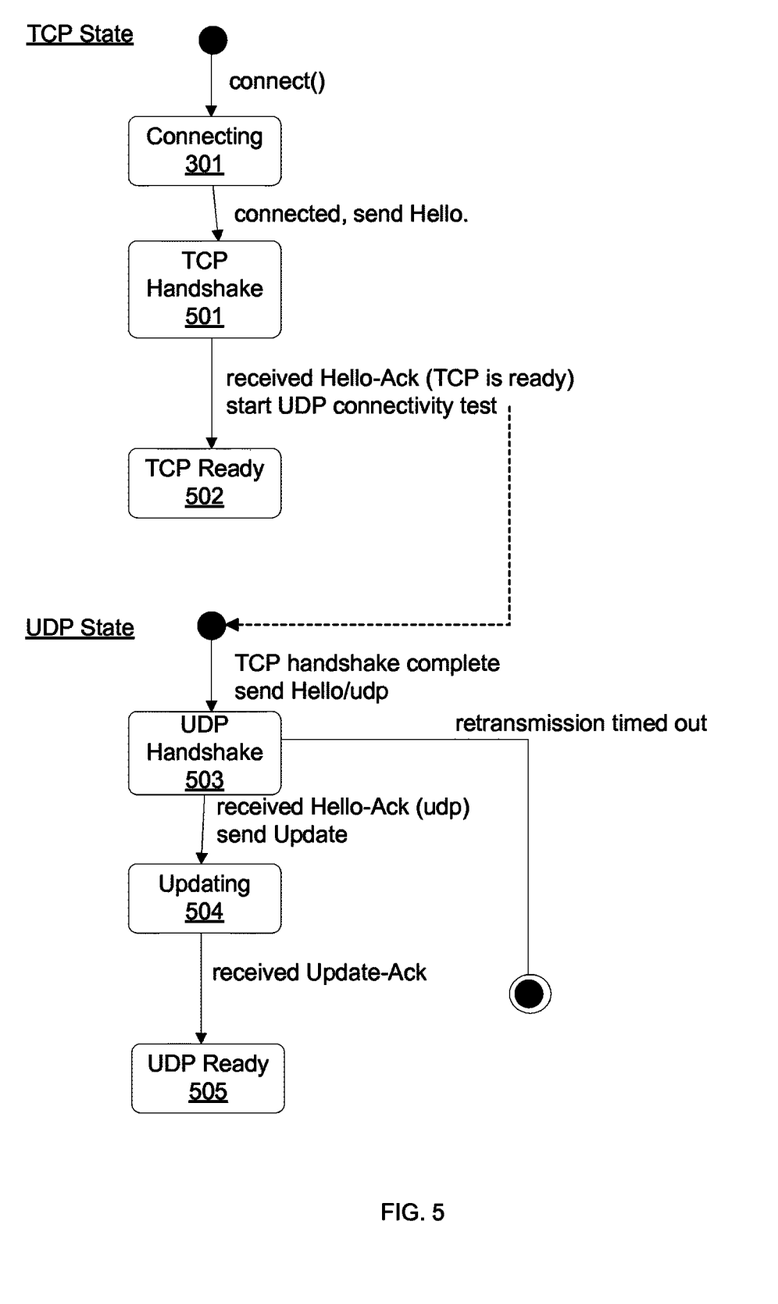
FIG. 5 illustrates an example of a state transition diagram for a client device, in accordance with an example implementation.

FIG. 5 illustrates an example of a state transition diagram for a client device, in accordance with an example implementation. In the example of the TCP state diagram, the application executed on a client device may send messages over the TCP after the TCP handshake is complete. For example, in conjunction with FIG. 3, the application of the client device executes a connect function 301 to connect to the UDP proxy via TCP. After the connection is established at 301, the client device will issue a Hello message to initiate the TCP handshake 501. At some point when the Hello-Ack is received (e.g., indicating that TCP is ready), the client device may send a Hello message with request for UDP to test for UDP connectivity. Such an action can occur at any time during the TCP ready state 502.

For initiating the UDP state, the client device may initiate a Hello message over UDP to the UDP proxy after the TCP handshake is complete. Such a message can also include the TCP token to identify the client device. The client device and the UDP proxy conduct the UDP Handshake 503 with procedures for retransmission by the client device if no Ack is received from the UDP proxy. After the client device receives the Hello-Ack from the UDP proxy, the client device will receive a UDP token. The client device therefore transmits the UDP token to the UDP proxy when a UDP communication is desired, and the updating process occurs at 504. The UDP proxy receives the update with the UDP token identifying the client device, and transmits an Update-Ack over UDP, whereupon the client device is ready for UDP transmission at 505.

Figure 6:
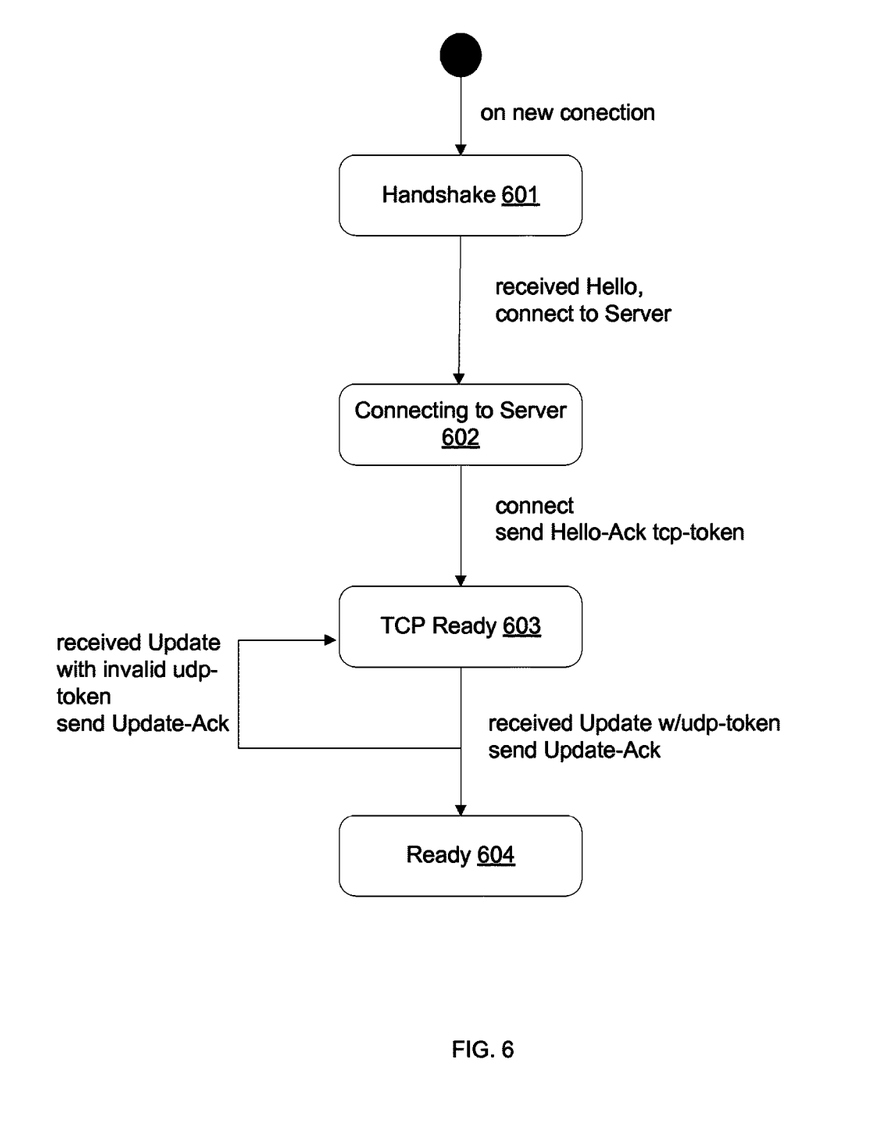
FIG. 6 illustrates an example state transition diagram of the UDP proxy, in accordance with an example implementation.

FIG. 6 illustrates an example state transition diagram of the UDP proxy, in accordance with an example implementation. When the UDP proxy receives a new TCP connection from a client device, the client device initiates a handshake with the UDP proxy as shown at 601. The handshake can include sending a hello message to the UDP proxy, wherein the UDP proxy requests a connection to the server. The UDP proxy receives the hello message and establishes a connection to the server at 602. When the UDP proxy connects with the server, the UDP proxy sends an acknowledgement to the hello message to the client device, along with the TCP token. The UDP proxy and client device are thereby TCP ready as illustrated at 603. Subsequently at 604, the UDP proxy may receive an update with a UDP-token and send an update acknowledgement to facilitate a UDP session, and is also configured to reject updates with invalid UDP-tokens.

Figure 7:
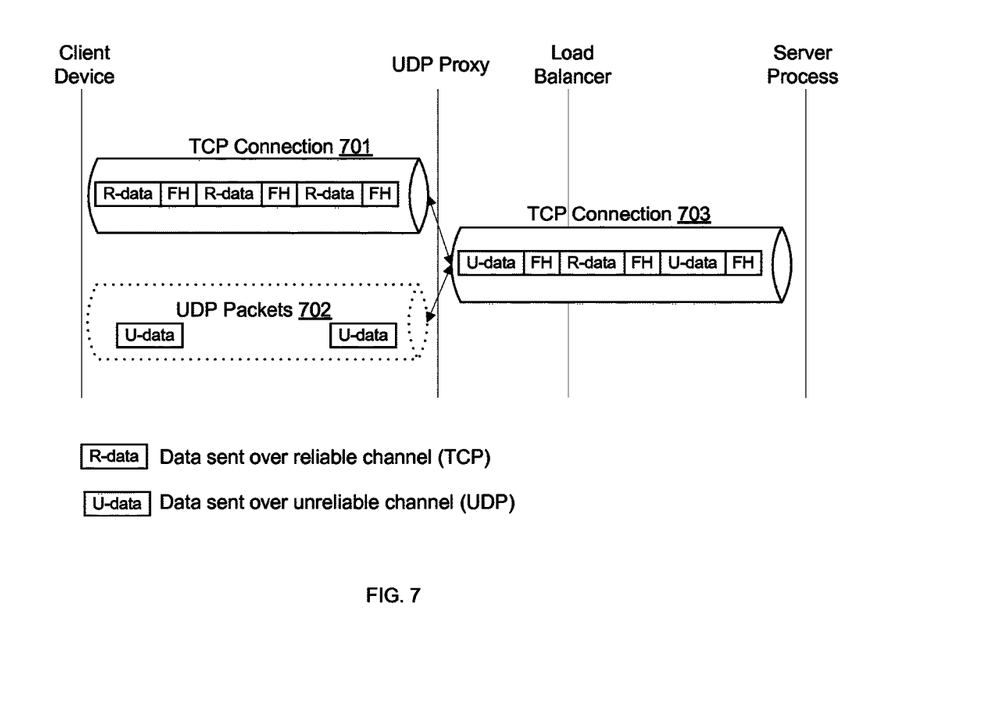
FIG. 7 illustrates an example of multiplexing and demultiplexing, in accordance with an example implementation.

FIG. 7 illustrates an example of multiplexing and demultiplexing, in accordance with an example implementation. In an example, the client device establishes a TCP connection 701 with the UDP proxy. The client device may send packets through the TCP connection 701 having frame headers (FH) and data as illustrated in FIGS. 4A and 4B. As the data is sent over a 'reliable' channel (TCP), the data is indicated as R-data as illustrated in FIG. 7.

During the TCP connection 701, the client device may send UDP packets 702 to the UDP proxy over a UDP session. The UDP packets include data indicated as U-data as the data is transmitted over an unreliable channel (UDP). Because the UDP packets may come in an ad-hoc manner at any time during the TCP connection 701 (e.g., due to real-time applications), the UDP proxy is configured to multiplex the packets into a transmission to the load balancer and server process through the TCP connection 703. In the example illustrated in TCP connection 703, R-data is transmitted with corresponding frame headers, and U-data is transmitted in the TCP connection 703 as received and multiplexed for transmission. U-data indicates to the server process that the data was sent through UDP, and replies from the server process can indicate data to be sent back by UDP as illustrated in FIGS. 4A and 4B.

In another example implementation, security protocols such as transport layer security (TLS) can be employed between the Client Device and the UDP Proxy for the TCP connection. In such an example implementation, the UDP proxy can transmit a shared secret key to the client device. The shared secret key can then be used for encrypting data sent over UDP by the client device, and decrypted by the UDP proxy. Such secret keys can be implemented with any encryption protocol known in the art that utilizes keys. Because the secret key exchange is conducted over the TCP instead of the UDP session, the protocols that are utilized in the related art for UDP sessions for doing key exchange and establishing encryption can be replaced by the security protocols and key exchange used in the TCP connection.

Figure 8:
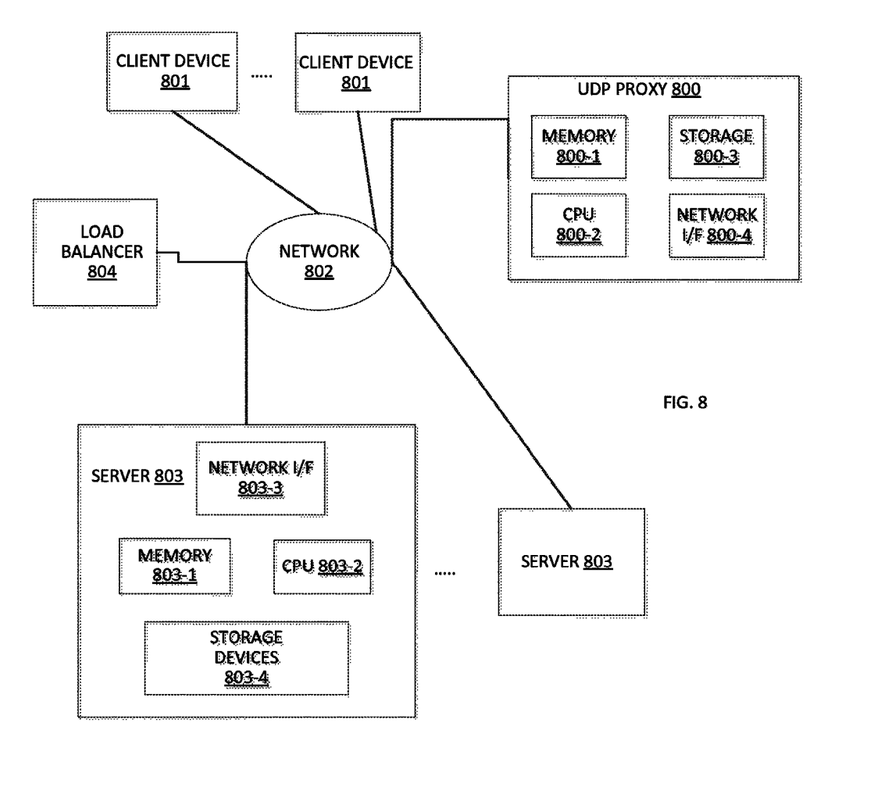
FIG. 8 illustrates a system diagram upon which example implementations can be implemented.
Figure 10:
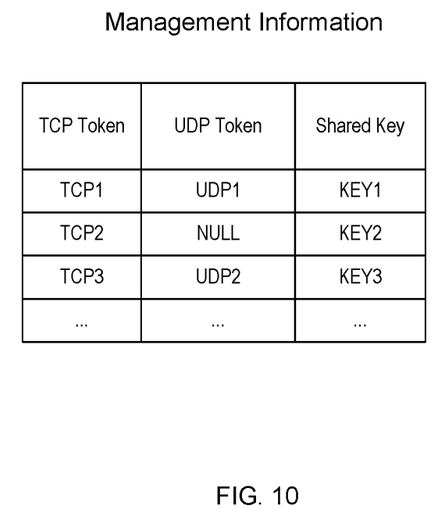
FIG. 10 illustrates example management information of the UDP proxy, in accordance with an example implementation.

FIG. 8 illustrates a system diagram upon which example implementations can be implemented. The system can include a UDP Proxy 800, one or more client devices 801, a Network 802, one or more servers 803, and a load balancer 804. UDP Proxy 800 can include memory 800-1, Central Processing Unit (CPU) 800-2, storage 800-3 and network interface (I/F) 800-4. Storage 800-3 may include one or more programs to facilitate the functionality of the UDP proxy 800 as described herein, which can be loaded into memory 800-1 and executed by CPU 800-2. Storage 800-3 can be in the form of a non-transitory computer readable medium as described herein. Network I/F 800-4 facilitates connections to the network 802 so the UDP proxy 800 can establish connections with the client device 801, the load balancer 804 and the one or more servers 803. Memory 800-1 may also be configured to store management information for the UDP proxy 800 as shown in FIG. 10, wherein the management information can be utilized to facilitate the implementation of the algorithms and flows described herein.

Client devices 801 may be implemented as any client device known in the art that can be configured to execute an application that utilizes TCP and UDP protocols. Examples of such devices can include, but are not limited to, personal computers, tablets, smartphones, laptops and so on.

Network 802 facilitates TCP and UDP sessions for the one or more client devices 801, the UDP proxy 800, the load balancer 804 and the one or more servers 803, and can be implemented as a wide area network (WAN) using IP protocol.

The one or more servers 803 can include memory 803-1, CPU 803-2, Network I/F 803-3 and one or more storage devices 803-4. One or more storage devices 803-4 may include one or more programs to facilitate applications and the functionality of the server process as described herein, which can be loaded into memory 803-1 and executed by CPU 803-2. The one or more storage devices 803-4 can also facilitate storage for database functionalities of the one or more servers 803, and can be implemented as a storage system as known in the art. Network I/F 803-3 facilitates connections to the network 802 so the one or more servers 803 can establish connections with the client device 801 and the UDP proxy 800 via the load balancer 804.

Load balancer 804 may balance the load to the one or more servers 803, and may determine what traffic to send which of the one or more servers 803 through TCP. The load balancer 804 may be implemented through any device or method as known in the art.

Figure 9:
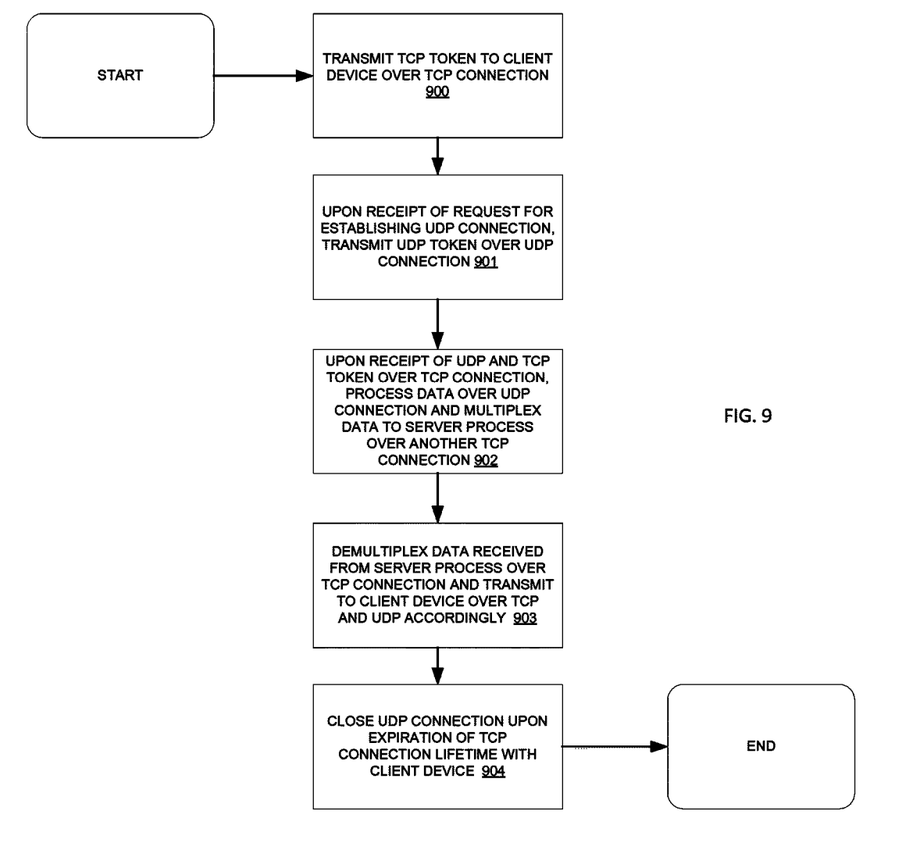
FIG. 9 illustrates a flow diagram in accordance with an example implementation.

FIG. 9 illustrates a flow diagram in accordance with an example implementation. The flow diagram illustrates an example overall flow of the UDP proxy. At 900, the client device may transmit a request to connect over a TCP connection, whereupon the UDP proxy transmits an acknowledgement with a TCP token to the client over the TCP connection. The UDP proxy may also transmit a shared secret key (e.g. encryption key) to the client device over a secure connection such as TLS for use in encrypting and decrypting data transmitted over UDP.

At 901, during the lifetime of the TCP connection between the client device and the UDP proxy, the client device transmits the TCP token to the UDP proxy for identification over a UDP session and requests establishment of the UDP session. The UDP proxy, upon receiving the request for establishing the UDP session along with the TCP token, transmits a UDP token to the client device over the UDP session.

During the lifetime of the TCP connection, the client device may transmit packets over UDP. The client device thus sends the UDP and TCP token over TCP connection to identify itself, and upon receipt of the UDP and TCP token over the TCP connection, the UDP proxy opens a UDP session with the client device and proceeds to receive data at 902. The UDP proxy will multiplex data received over the UDP session from the client device with data received over the TCP connection from the client device, and transmit the multiplex data to the server process.

Further, the server process may transmit data over another TCP connection to the UDP proxy. When the server process transmits data to the UDP proxy, the UDP proxy will demultiplex the data to determine which data is to be transmitted to the client device over UDP, and which data is to be transmitted to the client device over TCP at 903.

Finally, when the lifetime of the TCP connection expires with the client device, the UDP proxy will consider that the accompanying UDP session has also expired at 904. In this manner, the UDP session can be maintained by the UDP proxy based on the lifetime of the TCP connection with the client device. After the UDP session is terminated, the UDP proxy will ignore the unreliable data packets from the client device.

FIG. 10 illustrates example management information of the UDP proxy, in accordance with an example implementation. UDP proxy may manage the relationship between TCP tokens that were transmitted to one or more client devices, UDP tokens that were transmitted to the one or more client devices for establishing UDP sessions and secret keys that were exchanged between the UDP proxy and the one or more client devices. In this manner, the UDP proxy can be configured to reject UDP sessions when the TCP token and the corresponding UDP token were not received over TCP, and can also be configured to generate and transmit a UDP token to a device and associate the UDP token with the TCP token assigned to the client device. The UDP proxy can also encrypt/decrypt messages by using the shared key for a corresponding message received with a TCP token.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. An apparatus, comprising:
a processor, configured to:
transmit a transmission control protocol (TCP) token over a TCP connection to a device; and
upon receipt of a request sent by the device over User Datagram Protocol (UDP) for establishing a UDP session with the device, the request comprising the transmitted TCP token, establish the UDP session with the device, and transmit an acknowledgement over the UDP session to the device; and
a network interface configured to facilitate the TCP connection and the UDP session.

2. The apparatus of claim 1, wherein the processor is further configured to transmit a UDP token over the UDP session.

3. The apparatus of claim 2, wherein the processor is configured to:
upon receipt of a request comprising the UDP token and the TCP token over the TCP connection, multiplex data received over the UDP session; and
transmit the multiplex data over another TCP connection.

4. The apparatus of claim 3, wherein the processor is configured to multiplex data received through the UDP session by multiplexing the data received over the UDP session with data received over the TCP connection.

5. The apparatus of claim 3, wherein the processor is configured to:
demultiplex data received over the another TCP connection;
transmit the demultiplex data indicated as reliable over the TCP connection; and
transmit the demultiplex data indicated as unreliable over the UDP session.

6. The apparatus of claim 1, wherein the processor is configured to:
transmit an encryption key through a secure protocol over the TCP connection; and
decrypt data received through the UDP session with the encryption key.

7. The apparatus of claim 1, wherein the processor is further configured to maintain the UDP session during a lifetime of the TCP connection.

8. A method, comprising:
transmitting a transmission control protocol (TCP) token over a TCP connection to a device;
upon receipt of a request sent by the device over User Datagram Protocol (UDP) for establishing a UDP session with the device, the request comprising the transmitted TCP token, establishing the UDP session with the device and transmitting an acknowledgement over the UDP session to the device.

9. The method of claim 8, further comprising transmitting a UDP token over the UDP session.

10. The method of claim 9, further comprising:
upon receipt of a request comprising the UDP token and the TCP token over the TCP connection, multiplexing data received over the UDP session; and
transmitting the multiplex data over another TCP connection.

11. The method of claim 10, wherein the multiplexing data received through the UDP session comprises multiplexing the data received over the UDP session with data received over the TCP connection.

12. The method of claim 10, further comprising:
demultiplexing data received over the another TCP connection;
transmitting the demultiplex data indicated as reliable over the TCP connection; and
transmitting the demultiplex data indicated as unreliable over the UDP session.

13. The method of claim 8, further comprising:
transmitting an encryption key through a secure protocol over the TCP connection; and
decrypting data received through the UDP session with the encryption key.

14. The method of claim 8, further comprising maintaining the UDP session during a lifetime of the TCP connection.

15. A non-transitory computer readable medium storing instructions for executing a process, the instructions comprising:
transmitting a transmission control protocol (TCP) token over a TCP connection to a device; and
upon receipt of a request sent by the device over User Datagram Protocol (UDP) for establishing a UDP session, the request comprising the transmitted TCP token, establishing the UDP session with the device and transmitting an acknowledgement over the UDP session to the device.

16. The non-transitory computer readable medium of claim 15, wherein the multiplexing data received through the UDP session comprises multiplexing the data received over the UDP session with data received over the TCP connection.

17. The non-transitory computer readable medium of claim 15, wherein the instructions further comprise:
demultiplexing data received over the another TCP connection;
transmitting the demultiplex data indicated as reliable over the TCP connection; and
transmitting the demultiplex data indicated as unreliable over the UDP session.

18. The non-transitory computer readable medium of claim 15, wherein the instructions further comprise:
transmitting an encryption keys through a secure protocol over the TCP connection; and
decrypting data received through the UDP session with the encryption key.

19. The non-transitory computer readable medium of claim 15, wherein the instructions further comprise maintaining the UDP session during a lifetime of the TCP connection.

20. The non-transitory computer readable medium of claim 15, wherein the instructions further comprise transmitting a UDP token over the UDP session.

21. The non-transitory computer readable medium of claim 20, wherein the instructions further comprise:
upon receipt of a request comprising the UDP token and the TCP token over the TCP connection, multiplexing data received over the UDP session; and
transmitting the multiplex data over another TCP connection.

* * * * *